United States Patent
Watanabe

[19]

[11] Patent Number: 6,086,754
[45] Date of Patent: Jul. 11, 2000

[54] DISPENSING APPARATUS HAVING AN IMPROVED FILTER UNIT

[75] Inventor: Kazushige Watanabe, Maebashi, Japan

[73] Assignee: Sanden Corporation, Japan

[21] Appl. No.: 09/092,023

[22] Filed: Jun. 5, 1998

[30] Foreign Application Priority Data

Jun. 18, 1997 [JP] Japan ................................ 9-161053
Jul. 2, 1997 [JP] Japan ................................ 9-177389

[51] Int. Cl.[7] ............................ B01D 17/12; B01D 35/18
[52] U.S. Cl. ..................... 210/139; 210/149; 210/184; 210/186; 210/259; 210/266; 222/189.06
[58] Field of Search ................... 210/109, 110, 210/134, 139, 149, 175, 182, 184, 185, 186, 198.1, 202, 203, 257.1, 259, 651, 764, 774, 266; 222/146.2, 146.5, 189.06

[56] References Cited

U.S. PATENT DOCUMENTS

| | | | |
|---|---|---|---|
| 4,859,345 | 8/1989 | Inagaki | 210/764 |
| 4,948,499 | 8/1990 | Peranio | 210/186 |
| 5,152,900 | 10/1992 | Sekiguchi et al. | 210/774 |
| 5,518,613 | 5/1996 | Koczur et al. | 210/764 |
| 5,837,147 | 11/1998 | Juong | 210/175 |

FOREIGN PATENT DOCUMENTS 64-51189  2/1989  Japan .

*Primary Examiner*—Joseph W. Drodge
*Attorney, Agent, or Firm*—Banner & Witcoff, Ltd.

[57] ABSTRACT

For processing raw water into drinking water, a dispensing apparatus is provided with a filter member disposed in a water tank through which the raw water is made to flow. The filter member captures microorganisms contained in the raw water. A heating arrangement is thermally connected to the filter member and heats the filter member to kill the microorganisms that is captured by the filter member. It is preferable that the dispensing apparatus further provided with a adsorber member for adsorbing unfavorable substances contained in the raw water.

18 Claims, 11 Drawing Sheets

DISPENSING APPARATUS HAVING AN IMPROVED FILTER UNIT

BACKGROUND OF THE INVENTION

This invention relates to a dispensing apparatus for processing raw water such as tap water and groundwater into drinking water to dispense the drinking water.

It is assumed that microorganisms such as protozoa and bacteria are contained in raw water. In order to capture the microorganisms, a conventional dispensing apparatus of the type includes a filter unit comprising a filter member formed by a hollow fiber membrane module which is commercially available and well known in the art. When the filter unit is used in the dispensing apparatus, the microorganisms are captured by the filter member. Thus, the raw water is treated into purified or drinking water which is fed to a terminal such as a tap.

If the conventional dispensing apparatus is operated for a long period of time, the microorganisms once captured in the filter member may be released therefrom to be mixed into the purified water. In addition, the microorganisms may grow in the filter member to produce metabolites which deteriorate the water quality. This also results in fouling or scaling of the filter member.

SUMMARY OF THE INVENTION

It is therefore an object of this invention to provide a dispensing apparatus which is capable of preventing growth of microorganisms captured in a filter unit.

It is another object of this invention to provide a dispensing apparatus of the type described, which is capable of discarding residual dead microorganisms.

Other objects of this invention will become clear as the description proceeds.

A dispensing apparatus to which this invention is applicable is for processing raw water into drinking water to dispense the drinking water. The dispensing apparatus includes a filter unit which comprises a first water tank through which the raw water is made to flow, a filter member disposed in the first water tank for capturing microorganisms contained in the raw water, and first heating means thermally connected to the filter member for heating the filter member to kill the microorganisms that is captured by the filter member.

DESCRIPTION OF THE PREFERRED EMBODIMENTS

Referring to FIGS. 1 through 4, description will be made as regards a dispensing apparatus according to a first embodiment of this invention.

Figure 1:
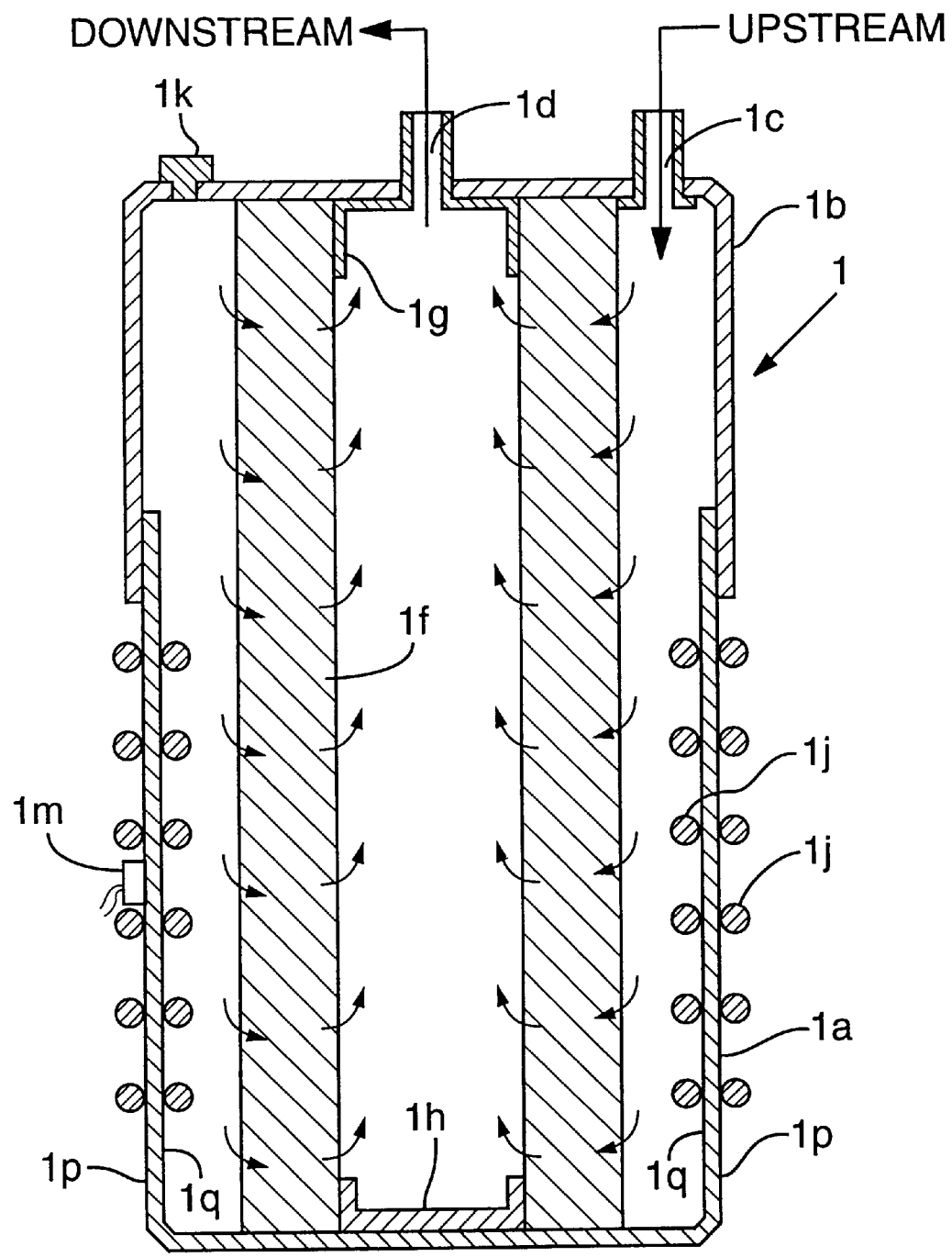
FIG. 1 is a sectional view of a filter unit included in a dispensing apparatus according to a first embodiment of this invention.

Referring to FIG. 1, the dispensing apparatus is for processing raw water such as tap water into purified drinking water to dispense the drinking water. The dispensing apparatus includes, as a part thereof, a filter unit 1 having a bottomed water tank 1a for passing or reserving the raw water. The water tank 1a has an upper end closed by a cap 1b. The cap 1b has an inlet port 1c and an outlet port 1d formed in its top plate at the periphery and at the center, respectively. The inlet port 1c is connected to an inlet pipe (not shown) and serves to introduce the raw water into the water tank 1a. The outlet port 1d is connected to an outlet pipe (not shown) and serves to feed the purified water from the water tank 1a towards a terminal such as a tap known in the art. The water tank 1a is referred to as a first water tank.

An annular filter member 1f is disposed in the water tank 1a and positioned at a center of the water tank 1a. The filter member 1f is held by upper and lower holders 1g and 1h within the water tank 1a. The filter member 1f is formed by resin fiber such as polypropylene, a sintered material, natural fiber such as cotton, or the like and has a plurality of pores each of which is not greater than 2 $\mu$m in a diameter thereof. The filter member 1f serves to capture microorganisms including protozoa such as Cryptosporidium and bacteria such as E. coli contained in the raw water.

A plurality of electric heaters 1j are attached to outer and inner surfaces (1p and 1q, respectively) of a peripheral side wall of the water tank 1a. The electric heaters 1j serve as a first heating arrangement which is thermally connected to the filter member 1f and is for heating the filter member 1f to kill the microorganisms that is captured by the filter member 1f.

The top plate of the cap 1b is provided with a vent plug 1k which is removably fitted to the top plate and known in the art. A temperature sensor 1m is attached to the peripheral side wall of the water tank 1a and is for detecting the temperature inside the water tank 1a to produce a temperature detection signal.

In the filter unit 1 of the above-mentioned structure, the raw water is fed to the tap in the following manner. Specifically, as depicted by solid arrows in FIG. 1, the raw water is supplied through the inlet port 1c into the water tank 1a and flows through the filter member 1f where the microorganisms are removed, and then fed to the tap through the outlet port 1d.

As described above, the raw water is purified by the filter unit 1. If such purification process is continued for a long period of time, a large amount of the microorganisms will be captured in the filter member 1f. In this event, those captured microorganisms may grow in the filter member 1f.

Figure 2:
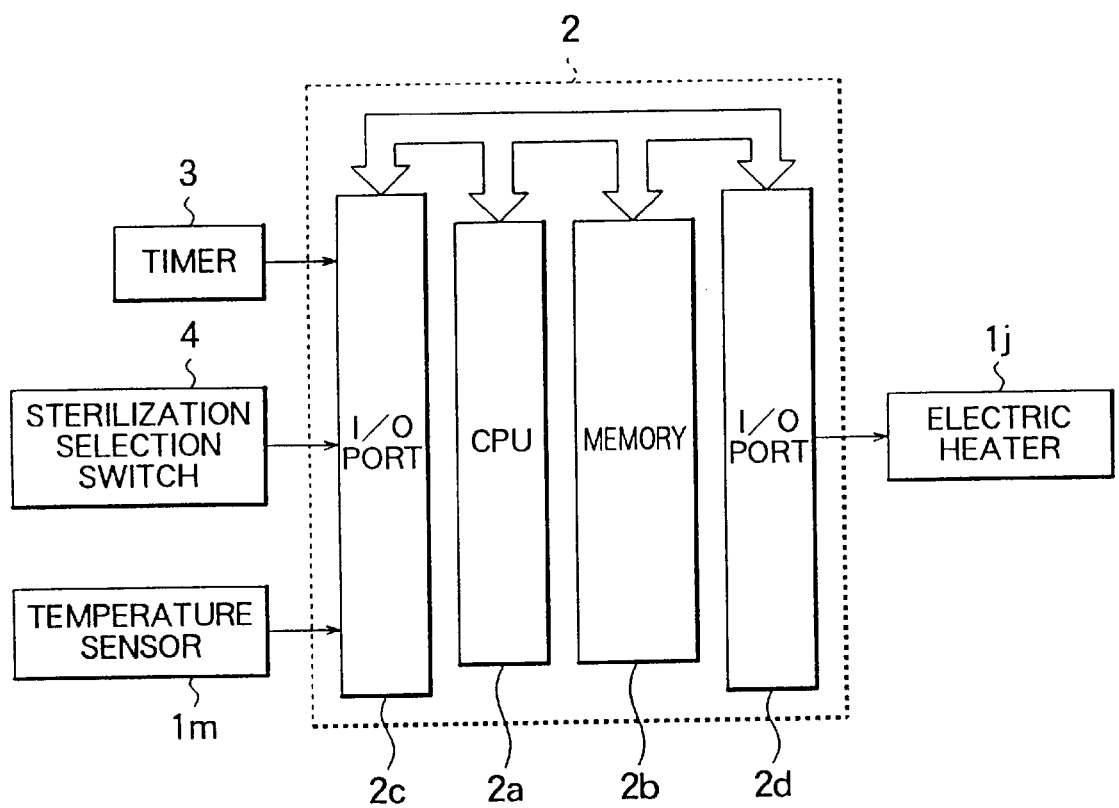
FIG. 2 is a block diagram of a control section included in the dispensing apparatus of FIG. 1.

Referring to FIG. 2, the dispensing apparatus further includes, as another part thereof, a control unit 2 which is connected to the temperature sensor 1m and is for controlling operation of the electric heaters 1j in response to the temperature detection signal to kill the captured microorganisms. The control unit 2 is implemented by a microcomputer and is automatically operated.

The control unit 2 comprises a central processing unit (CPU) 2a and a memory 2b storing a control program. The control unit 2 has I/O ports 2c and 2d for input of time signals from a timer 3, a sterilization selection switch 4, and the temperature sensor 1m and for output of control signals to the electric heaters 1j, respectively. The time signals are used in controlling a period and a start time instant of an energization of the electric heaters 1j. In other words, the timer 3 serves as one of a period timer and a start timer which are for determining the period and the start time instant, respectively.

The sterilization selection switch 4 is manually operated at any time to control the energization of the electric heaters 1j. When the sterilization selection switch 4 is turned on, the electric heaters 1j are immediately energized and continued during the period that is set in the period timer. When the sterilization selection switch 4 is tuned off, the energization of the electric heaters 1j are started at the start time instant that is set in the start timer.

Figure 3:
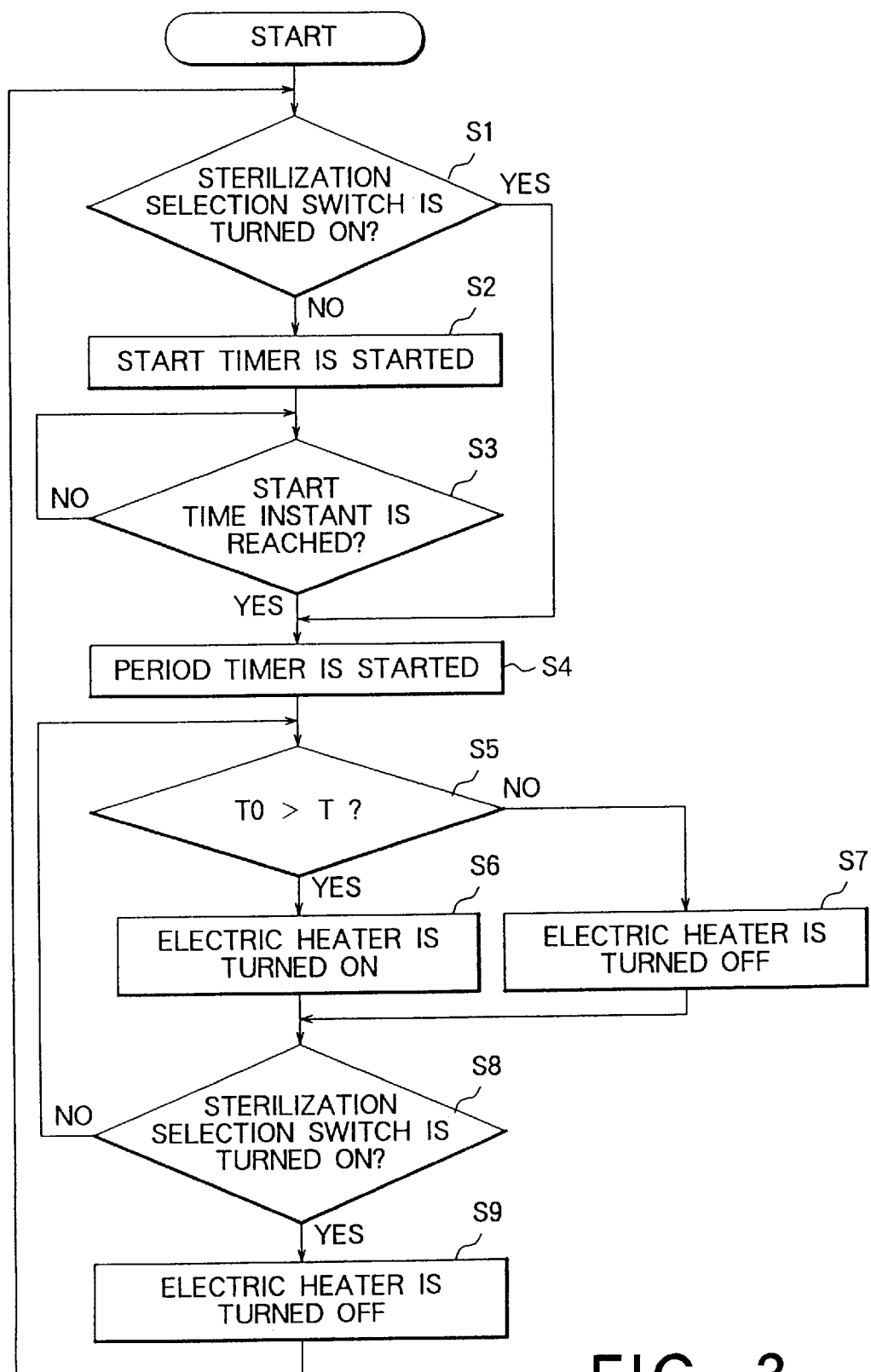
FIG. 3 is a flow chart for describing an operation of the dispensing apparatus of FIG. 1.

Referring to FIG. 3, the description will be directed to an operation of the control unit 2. In FIG. 3, a preselected temperature as an optimum sterilization temperature is represented by T0 while a detected temperature detected by the temperature sensor 1m is represented by T.

A start is followed by a step S1 at which monitoring is made about whether or not the sterilization selection switch 4 is turned on. If the sterilization selection switch 4 is not turned on, the step S1 proceeds to a step S2 at which the start timer is started. The step S2 is followed by a step S3 at which judgement is made about whether or not the start time instant is reached. Thus, the energization of the electric heaters 1j is waited until it is manually or automatically started. Specifically, when the sterilization selection switch 4 is manually turned on or if the start time instant is reached, each of the steps S1 and S3 is followed by a step S4 at which the period timer is started.

The step S4 is followed by a step S5 at which judgement is made about whether or not the detected temperature T reaches the preselected temperature T0. If the detected temperature T does not reach the preselected temperature T0, the step S5 proceeds to a step S6 at which the electric heaters 1j are turned on to heat the water in the water tank 1a. On the other hand, if the detected temperature T reaches the preselected temperature T0, the step S5 is followed by a step S7 at which the energization of the electric heaters 1j is stopped. In this manner, the electric heaters 1j are controllably turned on and off for the predetermined sterilization execution period to maintain the temperature in the water tank 1a at the optimum sterilization temperature or the preselected temperature. Thus, the microorganisms captured in the filter member 1f are heated and killed to reproduce the filter member 1f.

Each of the steps S6 and S7 is followed by a step S8 at which judgement is made about whether or not the predetermined sterilization execution period lapses. If the predetermined sterilization execution period lapses, the step S8 proceeds to a step S9 at which the energization of the electric heaters 1j is stopped. Thereafter, the above-mentioned steps are repeated to wait the manual operation of the sterilization selection switch 4 or the arrival of the predetermined energization start time instant.

In order to demonstrate the capture efficiency of the microorganisms in the filter member 1f and the sterilization efficiency by the electric heaters 1j, the present inventor made the following experimental tests.

Specifically, use was made of the filter member 1f having a plurality of pores each of which is 0.5 $\mu$m in a diameter thereof. The raw water with 100/ml of Cryptosporidium and $10^4$/ml of E. coli added thereto was made to flow through the filter unit 1. As a result, neither Cryptosporidium nor E. coli was detected in the purified water flowing out from the filter unit 1. Then, the filter member 1f was removed and washed by sterilized water. As a result, Cryptosporidium and E. coli of the above-mentioned levels were detected. From this test, it was proved that the filter member 1f having a pore size of 0.5 $\mu$m is excellent in capture efficiency of the microorganisms.

In another test, the filter member 1f was heated and sterilized after flowing the similar raw water. Thereafter, the filter member 1f was observed for the microorganisms. As a result, neither Cryptosporidium nor E. coli was detected. From this test, it was revealed that the heating/sterilizing operation by the electric heaters 1j was extremely effective in reproducing the filter member 1f. The results of these experimental tests are shown in the following table.

|  | Number of Bacteria | | |
| --- | --- | --- | --- |
|  | Raw Water before Sterilization | Filter After Sterilization | Purified Water from Outlet Port |
| Cryptosporidium | 100/ml | non | non |
| E. coli | $10^4$/ml | non | non |

The electric heaters 1j typically comprise metal heaters or cord heaters. Alternatively, the heating operation may be carried out by the use of electrodes arranged at both ends of the filter member 1f to be applied with an a.c. voltage. It will be understood that the electric heaters 1j can be applied with either of an a.c. voltage and a d.c. voltage. In the foregoing embodiment, the electric heaters 1j are arranged on the inner and the outer surfaces of the water tank 1a. Alternatively, the electric heaters 1j may be arranged on one of the inner and the outer surfaces. In order to avoid release of the heat energy of the electric heaters 1j, the water tank 1a may be covered with an insulator member.

As described above, the microorganisms captured in the filter are heated and killed by the heating arrangement.

The electric heaters are controlled in heat energy in response to the temperature detection signal. Therefore, the optimum sterilization temperature can be maintained to efficiently perform the heating/sterilizing operation.

Referring to FIGS. 4 through 8, the description will be made as regards a dispensing apparatus according to a second embodiment of this invention.

Figure 4:
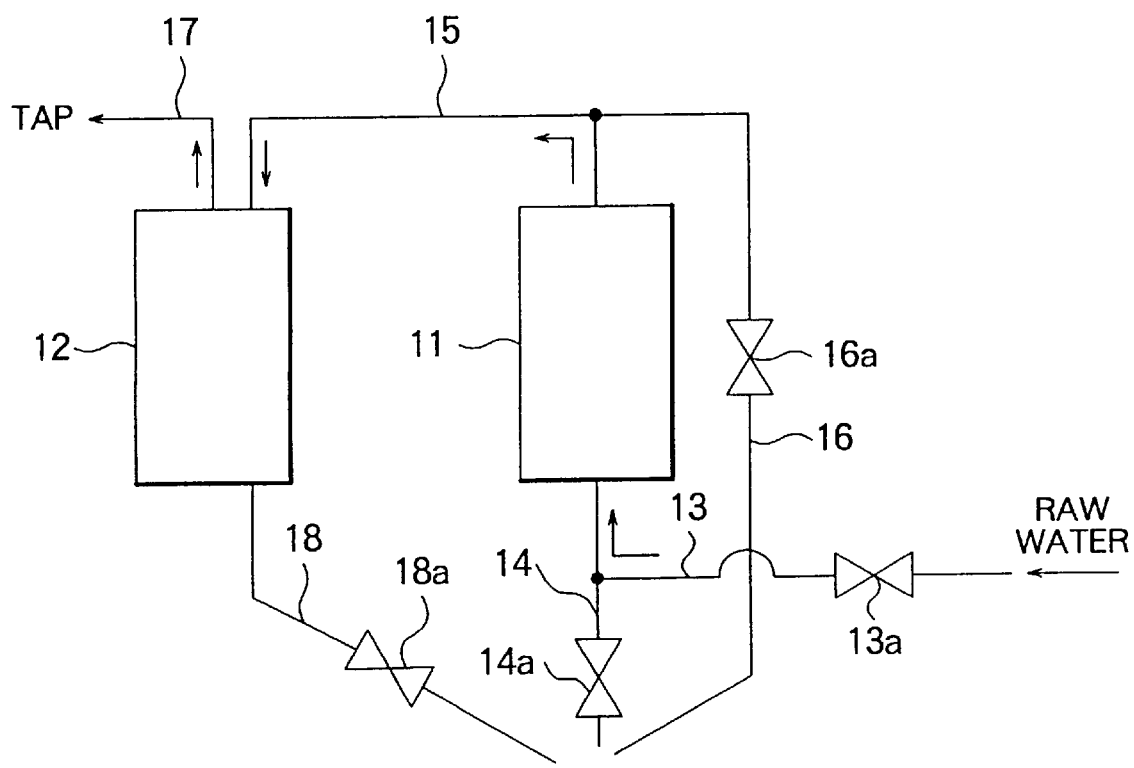
FIG. 4 shows a water pipeline circuit of a dispensing apparatus according to a second embodiment of this invention.

As illustrated in FIG. 4, the dispensing apparatus comprises a purification unit 11 and a filter unit 12 which are arranged in a water pipeline circuit to form a single waterway.

The purification unit 11 is connected at its bottom to an inlet pipe 13 for introducing the raw water. The inlet pipe 13 is provided with a water supply valve 13a for controlling a water supply operation to the purification unit 11. The water supply valve 13a will be referred to as a flow control valve.

The inlet pipe 13 is connected downstream of the water supply valve 13a to a drain pipe 14 opened to the atmosphere. The drain pipe 14 is provided with a drain control valve 14a for controlling a draining operation of the purification unit 11. The drain pipe 14 will be referred to as a water draining arrangement.

The purification unit 11 is connected at its top to an outlet pipe 15 for drawing purified water produced by the purification unit 11. Through the outlet pipe 15, the purified water is supplied into the filter unit 12. Between the purification unit 11 and the filter unit 12, the outlet pipe 15 is connected to an air introduction pipe 16 opened to the atmosphere. The air introduction pipe 16 is provided with an air control valve 16a for controlling introduction of air to each of the purification unit 11 and the filter unit 12.

On the other hand, the filter unit 12 is connected at its top to the outlet pipe 15 and a purified water pipe 17 communicating with a tap as a terminal. Through the purified water pipe 17, the purified water which has been sterilized is fed to the tap. The filter unit 12 is connected at its bottom to a drain pipe 18 opened to the atmosphere. The drain pipe 18 is provided with a drain control valve 18a for controlling a draining operation of the filter unit 12. In case of a beverage dispenser known in the art, a beverage outlet port is used as the terminal in place of the tap.

Figure 5:
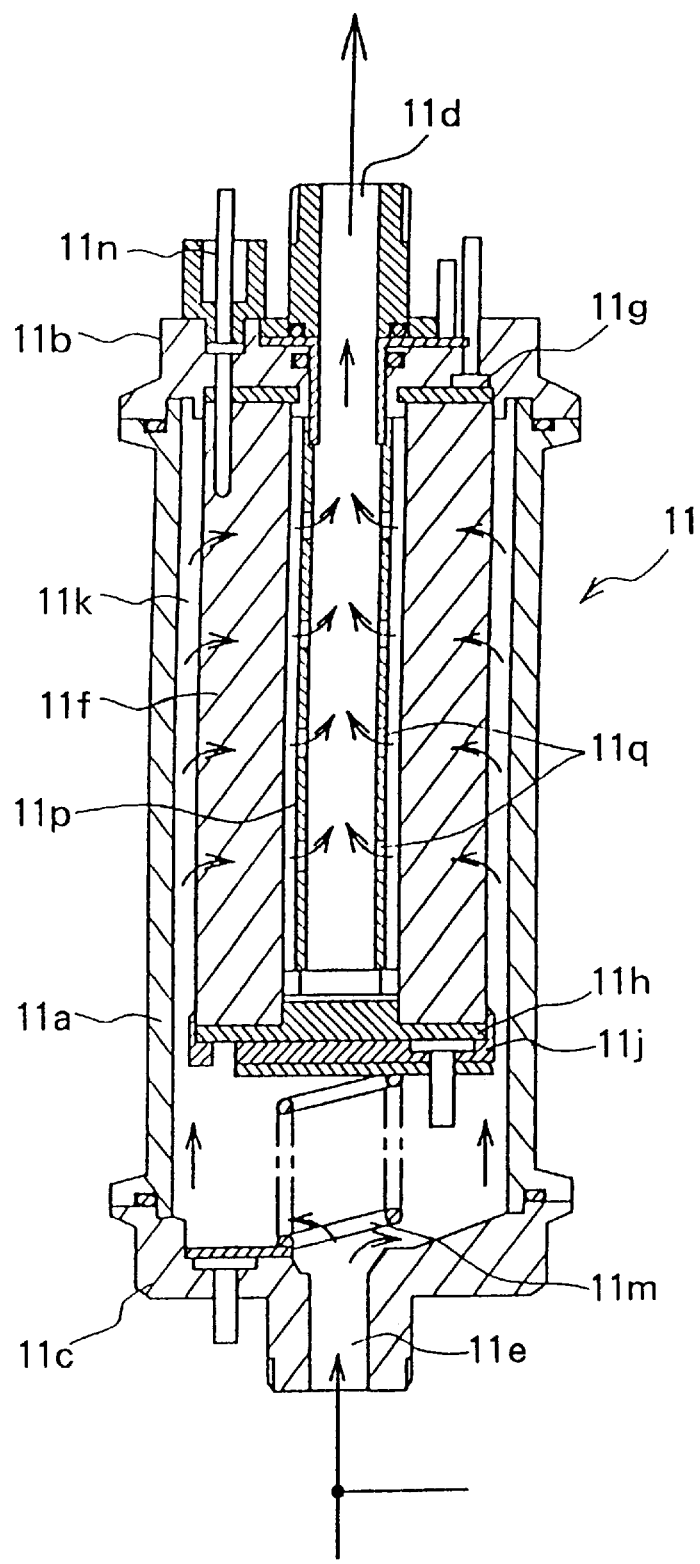
FIG. 5 is a sectional view of a purification unit included in the dispensing apparatus of FIG. 4.

Referring to FIG. 5, the description will be directed to the purification unit 11. The purification unit comprises a cylindrical water tank 11a for storing the raw water. The water tank 11a has upper and lower ends closed by upper and lower caps 11b and 11c, respectively. The upper cap 11b is provided with an outlet port 11d connected to the outlet pipe 15 while the lower cap 11c is provided with an inlet port 11e connected to the inlet pipe 13. The water tank 11a will be referred to as a second water tank.

The water tank 11a has a cylindrical adsorber member or portion 11f arranged therein. The adsorber portion 11f is formed by activated carbon fiber having conductivity. The adsorber portion 11f has an upper end held by the upper cap 11b through a first electrode 11g of a flat shape and a lower end held by a holder 11j through a second electrode 11h of a flat shape. The adsorber portion 11f serves to adsorb a chlorinous odor, a musty odor, trihalomethanes, organic compounds, and the like contained as unfavorable substances in the raw water. An annular path 11k is defined between an outer surface of the adsorber portion 11f and an inner surface of the water tank 11a to communicate with the inlet port 11e. Within the water tank 11a, the raw water introduced via the inlet port 11e flows into the adsorber portion 11f through the path 11k. A conductive coil spring 11m is interposed between the lower end of the adsorber portion 11f and the lower cap 11c. The coil spring 11m serves to urge the adsorber portion 11f towards the upper cap 11b so that the adsorber portion 11f is fixedly held in the water tank 11a. The adsorber portion 11f is provided with a temperature sensor 11n for detecting the temperature of the adsorber portion 11f.

Inside the adsorber portion 11f, an outflow pipe 11p extends in a vertical direction. The outflow pipe 11p has a number of water passage holes 11q for leading the purified water passing through the adsorber portion 11f to the outlet port 11d. The outflow pipe 11p is formed by a conductive material and serves as a third electrode.

Figure 6:
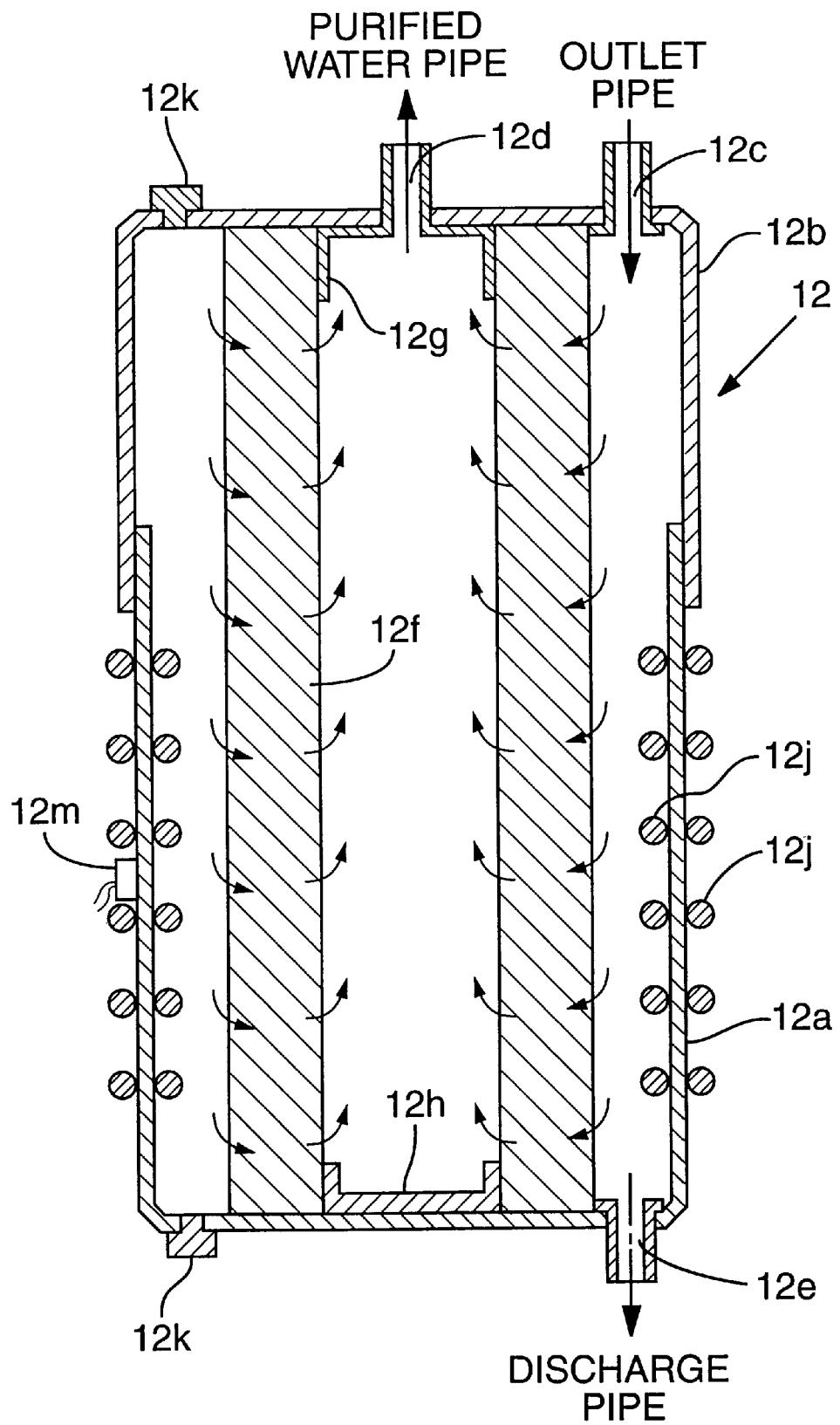
FIG. 6 is a sectional view of a filter unit included in the dispensing apparatus of FIG. 4.

Referring to FIG. 6, the filter unit 12 has a bottomed water tank 12a for reserving the purified water. The water tank 12a has an upper end closed by a cap 12b. The cap 12b has an inlet port 12c and an outlet port 12d formed in its top plate at the periphery and at the center, respectively. The inlet port 12c and the outlet port 12d are connected to the outlet pipe 15 and the purified water pipe 17, respectively. The water tank 12a has a bottom plate provided with a discharge port 12e connected to the discharge pipe 18. The water tank 12a serves as the first water tank.

In the water tank 12a, an annular filter member 12f is disposed at the center. The filter member 12f is held by upper and lower holders 12g and 12h within the water tank 12a. The filter member 12f is formed by resin fiber such as polypropylene, a sintered material, natural fiber such as cotton, or the like and has a plurality of pores each of which is not greater than 2 $\mu$m in a diameter thereof. The filter member 12f serves to capture protozoa such as Cryptosporidium and bacteria such as $E.$ $coli$ contained in the raw water.

On the other hand, electric heaters 12j are attached to outer and inner surfaces of a peripheral side wall of the water tank 12a. Each of the top plate of the cap 12b and the bottom plate of the water tank 12a is provided with a vent plug 12k which is removably fitted thereto and well known in the art. A temperature sensor 12m is attached to the peripheral side wall of the water tank 12a to detect the temperature of the filter member 12f.

In the dispensing apparatus of the above-mentioned structure, the raw water is treated in the following manner to be fed to the tap. Specifically, as depicted by solid arrows in FIGS. 4 through 6, the raw water is supplied through the inlet pipe 13 into the purification unit 11 and flows through the adsorber portion 11f where a chlorinous odor, a musty odor, trihalomethanes, organic compounds, and the like are removed. The raw water thus purified is supplied through the outlet pipe 15 to the filter unit 12 where protozoa and bacteria are removed, and then fed as the drinking water to the tap.

As described above, the raw water is purified by the purification unit 11 and the filter unit 12. If such purification process is continued for a long period of time, a large amount of adsorbed substances including the organic compounds will be accumulated in the adsorber portion 11f and captured microorganisms may grow in the filter member 12f.

Figure 7:
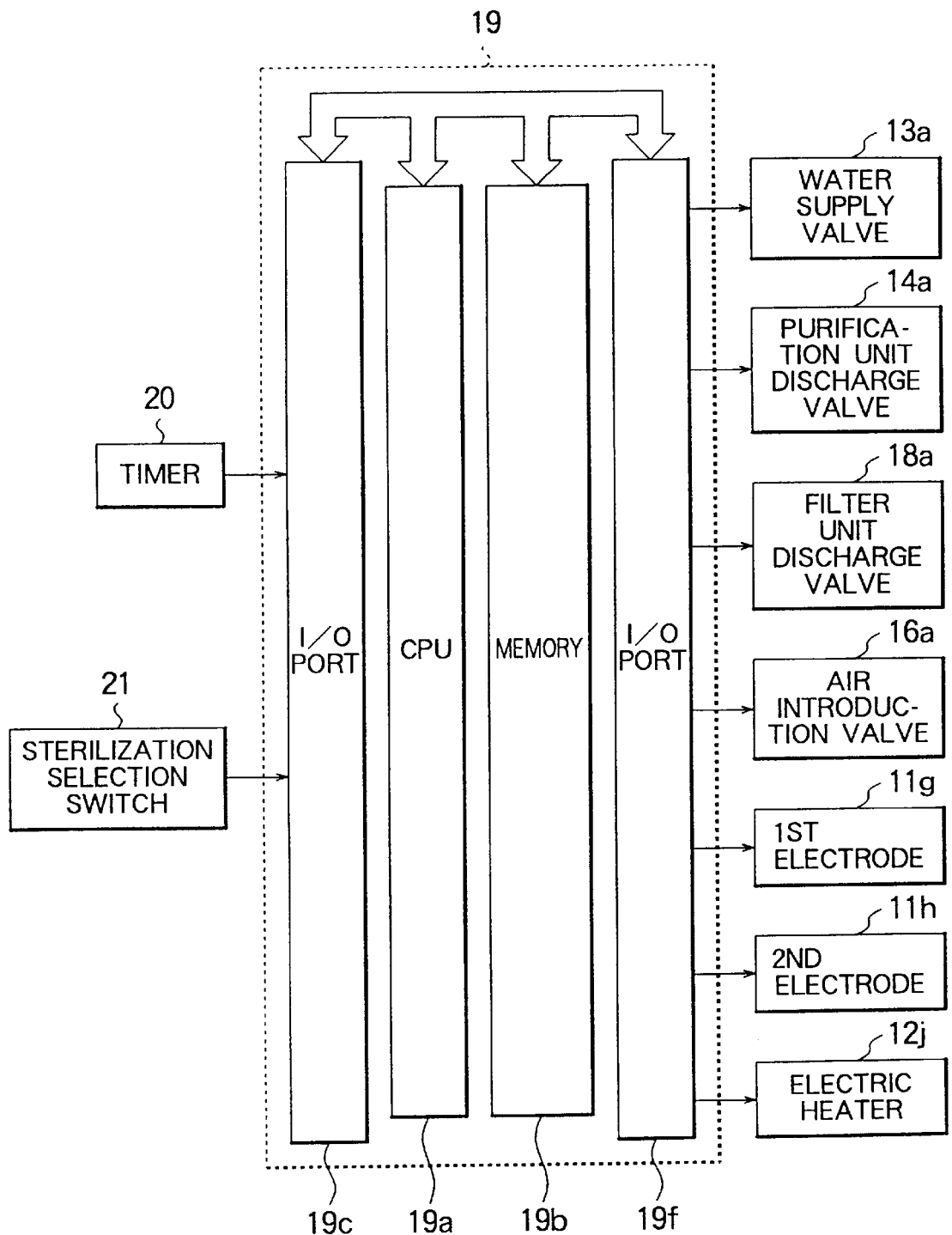
FIG. 7 is a block diagram of a control section included in the dispensing apparatus of FIG. 4.

Referring to FIG. 7, the dispensing apparatus has a control arrangement for removing the adsorbed substances such as organic compounds and the captured microorganisms. Specifically, the dispensing apparatus comprises a control unit 19 implemented by a microcomputer and is automatically operated. The control unit 19 comprises a central processing unit (CPU) 19a and a memory 19b storing a control program. The control unit 19 has I/O ports 19c and 19f for input of signals from a timer 20 and a sterilization selection switch 21 and for output of signals to the water supply valve 13a, the discharge valves 14a and 18a, the air introduction valve 16a, the first and the second electrodes 11g and 11h, and the electric heaters 12j, respectively.

The timer 20 measures and controls a draining period of the water tanks 11a and 12a in the purification and the filter units 11 and 12, an energizing period of the first electrode 11g, the second electrode 11h, and the electric heaters 12j, and a washing period of the adsorber portion 11f and the filter member 12f (i.e., an open period of the water supply valve 13a). The sterilization selection switch 21 is for producing an output signal any time when it is desired to reproduce the adsorber portion 11f and the filter member 12f by sterilization and washing.

When the purification process in which the purified water is supplied to the tap is operated for a long period of time, a large amount of the adsorbed substances are accumulated in the adsorber portion 11f and the captured microorganisms grow in the filter member 12f. In this event, a sterilization process is operated.

Figure 8:
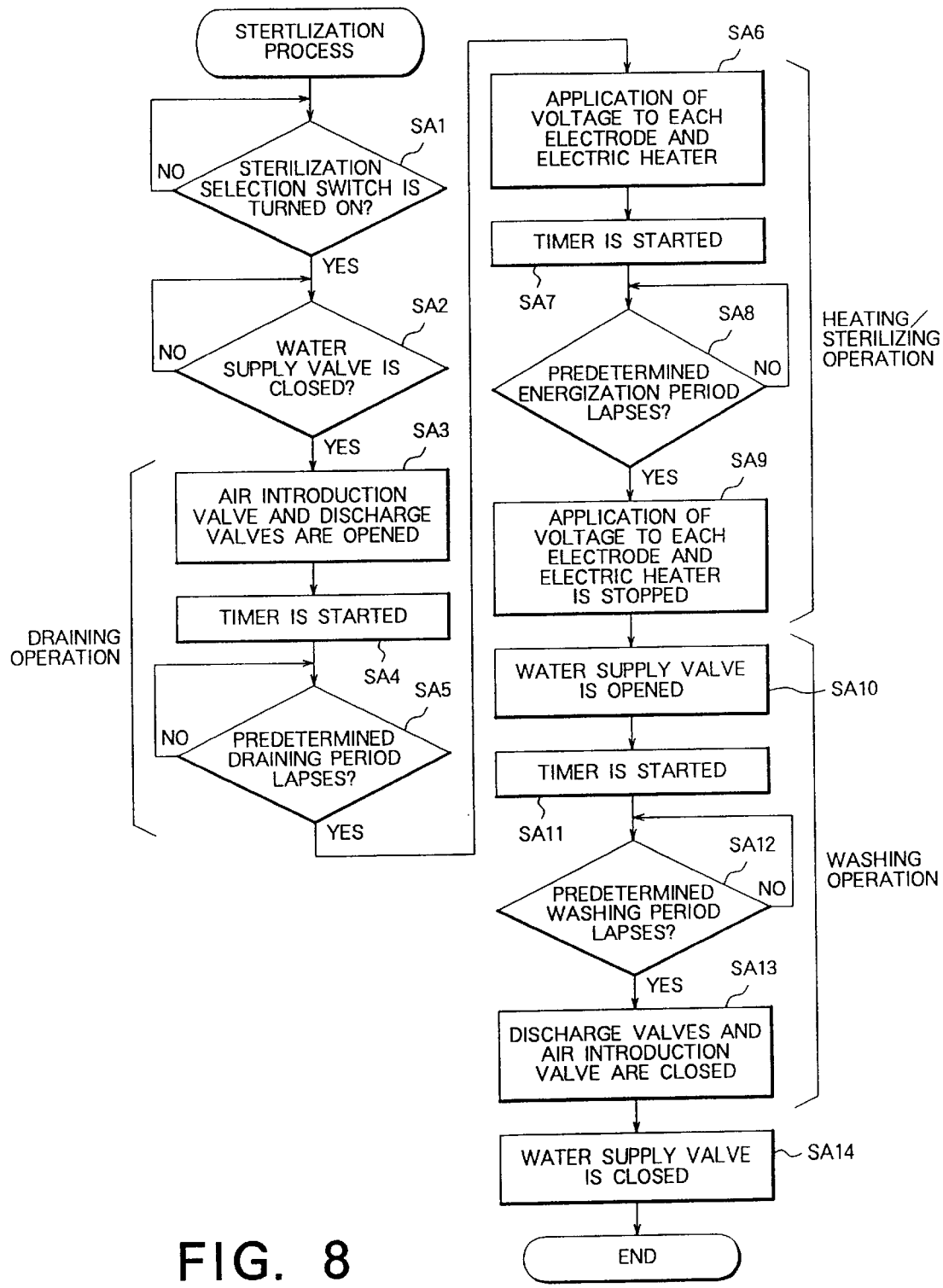
FIG. 8 is a flow chart for describing an operation of the dispensing apparatus of FIG. 4.

Referring to FIG. 8, the description will be made as regards an operation of the control unit 19.

At first, the sterilization selection switch 21 is turned on at a step SA1. The step SA1 is followed by a step SA2 at which judgement is made about whether or not the water supply valve 13a is closed. If the water supply valve 13a is closed, i.e., if the purification process is not operated, the step SA2 proceeds to a step SA3. In the step SA3, the air introduction valve 16a is opened to make the purification unit 11 and the filter unit 12 open to the atmosphere while the discharge valves 14a and 18a are opened. At a step SA4 immediately after the step SA3, the timer 20 is started. The step SA4 is followed by a step SA5 at which judgement is made about whether or not a predetermined draining period lapses. If the predetermined draining period lapses, i.e., a draining operation is completed, the step SA5 proceeds to a step SA6. Through the steps SA3 to SA5, the water tanks 11a and 12a are drained through the discharge pipes 14 and 18, respectively. In this connection, the steps SA3 to SA5 will be referred to as a draining operation. At the step SA6, an a.c. voltage is applied to each of the first and the second electrodes 11g and 11h of the purification unit 11 and to the electric heaters 12j of the filter unit 12. At a step SA7 immediately after the step S6, the timer 20 is started. At a step S8 following the step SA7, judgement is made about whether or not a predetermined energizing period lapses. If the predetermined energizing period lapses, the step SA8 proceeds to a step SA9 at which the application of the a.c. voltage is stopped. Through the steps SA6 to SA9, the adsorber portion 11f and the filter member 12f are heated to desorb the adsorbed substances in the adsorber portion 11f and to kill the captured microorganisms in the filter member 12f. On carrying out the steps SA6 to SA9, a combination of the control unit 19 and the first and the second electrodes 11g and 11h will be referred to as a second heating arrangement.

At a step SA10 following the step SA9, the water supply valve 13a is opened to flow the tap water through the water tanks 11a and 12a. At a step SA11 immediately after the step SA10, the timer 10 is started. The step SA11 is followed by a step SA12 at which judgement is made about whether or not a predetermined washing period lapses. If the predetermined washing period lapses, each of the discharge valves 14a and 18a and the air introduction valve 16a is closed at a step SA13. Through the steps SA10 to SA13, the adsorbed substances desorbed from the adsorber portion 11f and the dead microorganisms remaining in the filter member 12f are washed out to be discharged through the discharge pipes 14a and 18a, respectively. In this connection, the steps SA10 to SA13 will be referred to as a washing operation. The step SA13 proceeds to the step SA14 at which the water supply valve 13a is closed. Now, the sterilization process is completed and the dispensing apparatus is ready to perform the purification process.

In the second embodiment, not only the adsorber portion 11f of the purification unit 11 is heated but also the filter member 12f of the filter unit 12 is sterilized. Therefore, the growth of the captured microorganisms is inhibited. In addition, the residual dead microorganisms are discharged and do not serve as nutrients for the captured microorganisms.

Figure 9:
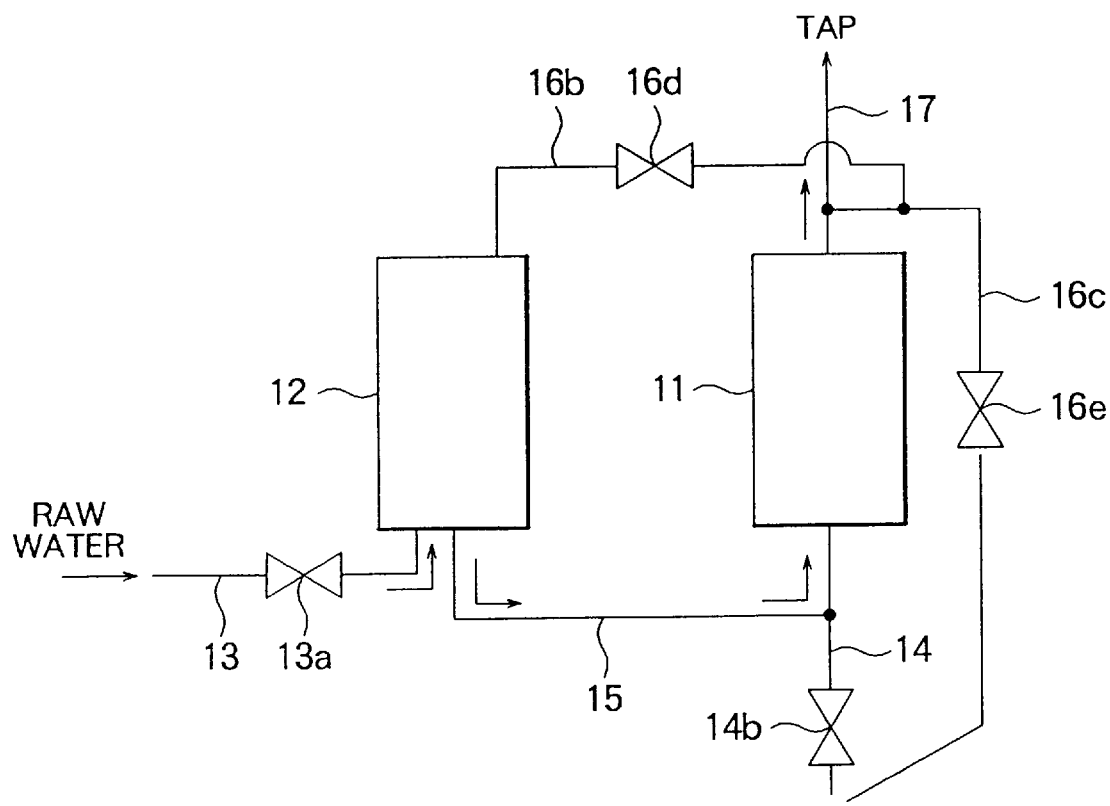
FIG. 9 shows a water pipeline circuit of a dispensing apparatus according to a third embodiment of this invention.
Figure 10:
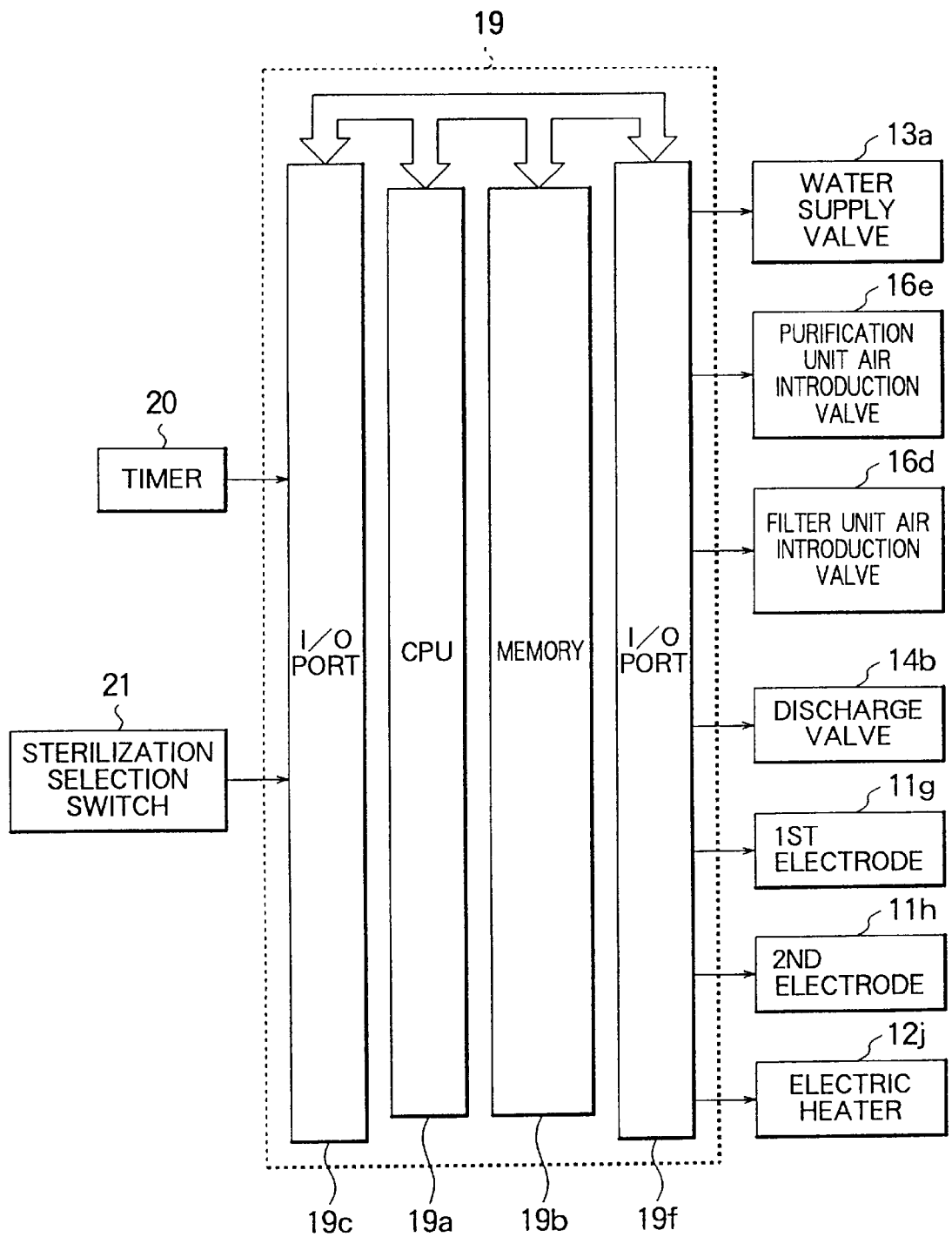
FIG. 10 is a block diagram of a control section included in the dispensing apparatus of FIG. 9.
Figure 11:
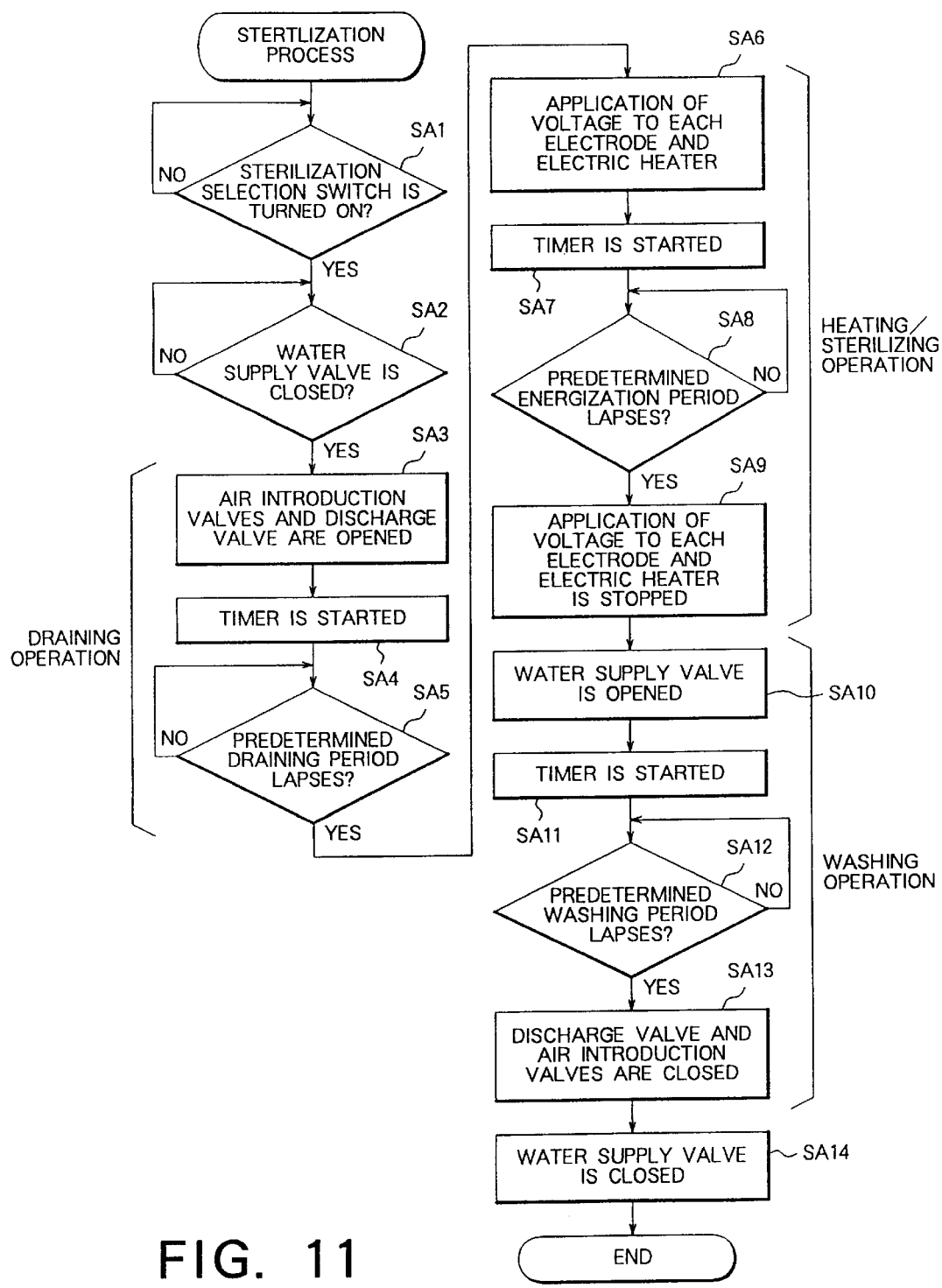
FIG. 11 is a flow chart for describing an operation of the dispensing apparatus of FIG. 9.

Referring to FIGS. 9 through 11, the description is made about a dispensing apparatus according to a third embodiment of this invention. The filter unit 12 is arranged downstream of the purification unit 11 in the second embodiment while the filter unit 12 is arranged upstream of the purification unit 1 in the third embodiment. Similar parts are designated by like reference numerals and will not be described any longer.

Referring to FIG. 9, the inlet pipe 13 with the water supply valve 13a is connected to the filter unit 12. The outlet pipe 15 is connected at its downstream side to the bottom of the filter unit 12 and at its upstream side to the bottom of the purification unit 11. Thus, the raw water is at first fed to the filter unit 12 then to the purification unit 11. An air introduction pipe 16b is connected to the top of the filter unit 12 while an air introduction pipe 16c is connected to the top of the purification unit 11 via the purified water pipe 17. The air introduction pipes 16b and 16c are connected to each other. The air introduction pipes 16b and 16c are provided with air introduction valves 16d and 16e to control introduction of air through the air introduction pipes 16b and 16c, respectively. A combination of the air introduction pipes 16b and 16c and the air introduction valves 16d and 16e serves as an air introducing arrangement. The discharge pipe 14 with a discharge valve 14b is connected to the bottom of the purification unit 11. The discharge valve 14b serves to control the draining operation of the purification unit 11 and the filter unit 12. A combination of the discharge pipe 14 and the discharge valve 14b serves as a draining arrangement. Each of the purification unit 11 and the filter unit 12 is similar in structure to that of the second embodiment.

In the purification process of the third embodiment, the raw water passes through the filter unit 12 to capture the microorganisms and then through the purification unit 11 to capture the chlorinous odor, the musty odor, trihalomethane, the organic compounds, and so on, as depicted by solid arrows in FIG. 9. Thus, the raw water is treated into the purified water which is fed as the drinking water to the tap.

Referring to FIG. 10, the control unit 19 of the dispensing apparatus in the third embodiment is similar to that of the second embodiment except the following respect. Specifically, the control unit 19 in the third embodiment controls the air introduction valves 16d and 16e and the discharge valve 14b while the air introduction valve 16a and the discharge valves 14a and 18a are controlled in the second embodiment.

Referring to FIG. 11, an operation of the control unit 19 in the sterilization mode in the third embodiment is also similar to that of the second embodiment except the following respect. Specifically, in the steps SA3 (draining operation) and SA13 (washing operation), the air introduction valves 16d and 16e and the discharge valve 14b are controllably opened and closed.

Thus, in case where the filter unit 12 is arranged upstream of the purification unit 11, the similar effect is achieved in inhibiting the growth of the microorganisms.

In each of the second and the third embodiments, the heating/sterilizing operation of the adsorber portion 11f and the filter member 12f is controlled by monitoring the energizing period by the timer 20. Alternatively, the first and the second electrodes 11g and 11h and the electric heaters 12j may be controllably turned on and off by the temperature sensors 11n and 12m so that each of the adsorber portion 11f and the filter member 12f is heated to an optimum temperature for the sterilizing process. In the second and the third embodiments, the adsorber portion 11f of the purification unit 11 is heated by directly applying the a.c. voltage. Alternatively, the adsorber portion 11f may be heated by electric heaters in the manner similar to the filter member 12f of the filter unit 12.

As described above, the microorganisms captured in the filter unit are heated by the heating arrangement to be killed. Therefore, the growth of the microorganisms is inhibited. It is thus possible to prevent the microorganisms and their metabolites from being mixed into the purified water and to prevent resultant deterioration of the quality of the purified water.

In addition, each of the water tanks can be drained by the air introducing arrangement and the draining arrangement. Therefore, the microorganisms killed by the heating arrangement to be left as the residual dead microorganisms can be discharged during the draining operation. Thus, the residual dead microorganisms are not used as the nutrients for the captured microorganisms. It is therefore possible to provide the purified water in a further improved sanitary condition.

What is claimed is:

1. A dispensing apparatus for processing raw water into drinking water to dispense said drinking water, said dispensing apparatus including a filter unit comprising:

a first water tank through which said raw water is made to flow, said tank having a side wall defining an inner surface and an outer surface;

a filter member disposed in said first water tank for capturing microorganisms contained in said raw water, said filter member extending along said side wall defining a gap therebetween; and first heating means positioned along and adjacent to said inner and outer surfaces of said side wall and thermally connected to said filter member for heating said filter member to kill said microorganisms that are captured by said filter member and means for removing the dead, captured microorganisms from the tank including means for introducing air to the tank.

2. A dispensing apparatus as claimed in claim 1, wherein said filter member has a plurality of pores each of which is not greater than 2 $\mu$m in diameter thereof.

3. A dispensing apparatus as claimed in claim 1, wherein said first heating means comprises an electric heater mechanically connected adjacent to said first water tank for indirectly heating said filter member.

4. A dispensing apparatus as claimed in claim 3, wherein said raw water has a water temperature, said filter unit further comprising:

a temperature sensor for detecting said water temperature in said first water tank to produce a temperature detection signal; and control means connected to said temperature sensor and responsive to said temperature detection signal for controlling operation of said electric heater.

5. A dispensing apparatus for processing raw water into drinking water to dispense said drinking water, said dispensing apparatus including a filter unit comprising:

a first water tank through which said raw water is made to flow;

a filter member disposed in said first water tank for capturing microorganisms contained in said raw water;

first heating means thermally connected to said filter member for heating said filter member to kill said microorganisms that are captured by said filter member; and a purification unit connected to said filter unit in series, said purification unit comprising:

a second water tank communicated with said first water tank to form a single waterway in cooperation with said first water tank, wherein said raw water is made to flow through said single waterway; and an adsorber member disposed in said second water tank for adsorbing substances contained in said raw water and means for removing the dead, captured microorganisms from at least one of the first and second tanks including means for introducing air to said at least one tank.

6. A dispensing apparatus as claimed in claim 5, wherein said purification unit further comprises second heating means connected to said adsorber member for heating said adsorber member.

7. A dispensing apparatus as claimed in claim 5, wherein said filter unit and said purification unit are placed so that said raw water flows from said filter unit towards said purification unit.

8. A dispensing apparatus as claimed in claim 5, wherein said filter unit and said purification unit are placed so that said raw water flows from said purification unit towards said filter unit.

9. A dispensing apparatus as claimed in claim 5, further comprising a flow control valve connected to said single waterway for controlling a flow of said raw water in said single waterway.

10. A dispensing apparatus as claimed in claim 9, further comprising:

an inlet pipe connected to said single waterway for introducing said raw water into said single waterway; and an outlet pipe connected to said single waterway for drawing said drinking water from said single waterway, said flow control valve being provided in said inlet pipe.

11. A dispensing apparatus for processing raw water into drinking water to dispense said drinking water, said dispensing apparatus including a filter unit comprising:

a first water tank through which said raw water is made to flow;

a filter member disposed in said first water tank for capturing microorganisms contained in said raw water;

air introducing means connected to said first water tank for introducing atmospheric air into said first water tank;

water draining means connected to said first water tank for draining said raw water from said first water tank;

first heating means thermally connected to said filter member for heating said filter member to kill said microorganisms that are captured by said filter member; and a purification unit connected to said filter unit in series, said purification unit comprising:

a second water tank communicated with said first water tank to form a single waterway in cooperation with said first water tank, wherein said raw water is made to flow through said single waterway; and an adsorber member disposed in said second water tank for adsorbing substances contained in said raw water.

12. A dispensing apparatus as claimed in claim 11, further comprising:

an air control valve connected to said air introducing means for controlling inflow of said atmospheric air into said first water tank; and a drain control valve connected to said water draining means for controlling outflow of said raw water from said first water tank.

13. A dispensing apparatus as claimed in claim 12, further comprising a timer, each of said air control and said drain control valves having their operation controlled in accordance with said timer.

14. A dispensing apparatus as claimed in claim 11, wherein said purification unit further comprises second heating means connected to said adsorber member for heating said adsorber member.

15. A dispensing apparatus as claimed in claim 11, wherein said filter unit and said purification unit are placed so that said raw water flows from said filter unit towards said purification unit.

16. A dispensing apparatus as claimed in claim 11, wherein said filter unit and said purification unit are placed so that said raw water flows from said purification unit towards said filter unit.

17. A dispensing apparatus as claimed in claim 11, further comprising a flow control valve connected to said single waterway for controlling a flow of said raw water in said single waterway.

18. A dispensing apparatus as claimed in claim 17, further comprising:
an inlet pipe connected to said single waterway for introducing said raw water into said single waterway; and
an outlet pipe connected to said single waterway for drawing said drinking water from said single waterway, said flow control valve being provided in said inlet pipe.

* * * * *